Patented Dec. 8, 1936

2,063,416

UNITED STATES PATENT OFFICE 2,063,416

TRIISOPROPYL-NAPHTHALENE-BETA-SULPHONIC ACID COMPOUNDS AND PROCESS FOR PREPARING THEM

Henry J. Weiland, South Milwaukee, and Milton A. Prahl, Milwaukee, Wis., assignors to E. I. du Pont de Nemours & Company, Wilmington, Del., a corporation of Delaware No Drawing. Application August 25, 1933, Serial No. 686,854

4 Claims. (Cl. 260—159)

This invention relates to wetting agents.

It is an object of this invention to prepare a wetting agent paste which is characterized by high wetting power and at the same time possesses great stability in paste form.

Isopropyl - naphthalene - sulphonic acids are well known for their power to increase the wetting capacity of aqueous treatment baths, and have therefore found wide use in the textile and leather industry as wetting, emulsifying and dispersing agents. This property is inherent both in the free sulphonic acids as well as in salts thereof. The latter, however, are more common in use, because of their greater chemical stability, and because of their white color which enables the non-technical man in the textile industry to judge as to their purity.

The alkali salts are usually marketed as a powder. For many uses, however, a fine powder is objectionable because of its extreme dustiness; the dust is irritating and disagreeable when inhaled. The fine powder also forms lumps while being dissolved in water, and solution therefore takes place with comparative difficulty. The powder is also very hygroscopic, and tends to cake together into a hard solid mass if exposed to damp weather. For many purposes, therefore, it is preferable to market these products as an aqueous paste containing varying quantities of the active material. The sodium salts of mixtures of mono- and di-isopropyl-naphthalene-sulphonic acids, as well as that of tri-isopropyl-naphthalene-alpha-sulphonic acid, readily form light colored, homogeneous and stable pastes which may readily be standardized to contain definite amounts of the active ingredient, for example, 50 or 60%. Such pastes exhibit the moderately good wetting out properties possessed by the active material contained therein.

Now, it has been observed, and is a well known fact at this date, that the alkali-metal salts of tri-isopropyl-naphthalene-beta-sulphonic acid are considerably better wetting agents than any of the aforementioned. At moderately dilute concentrations, the wetting power of tri-isopropyl-naphthalene-beta-sulphonic acid or its alkali-metal salts is several times greater than that of the di-isopropyl derivative, and exceeds also the power of the tri-ispropyl-alpha derivative. These compounds, however, do not form a satisfactory paste with water. When ground with water, the sodium and potassium salts of tri-isopropyl-naphthalene-beta-sulphonic acid form, instead of a smooth paste, a curdled mass which is unstable both physically and chemically. After a short time this paste separates from the water and tends to darken in color. These drawbacks are sufficient to make this paste a very poor seller in spite of its otherwise valuable properties.

We have now found that the ammonium salt of tri-isopropyl-naphthalene-beta-sulphonic acid forms a homogeneous and stable paste of good appearance and good keeping qualities. Its power as a wetting agent is at the same time equal to that of the sodium or potassium salt, and, as already stated, is far superior to the wetting power of the agents now commonly on the market in paste form.

The above effect was not to be foreseen, since ammonium is generally considered the equivalent of sodium or potassium for most practical purposes where the use of a water soluble salt is involved. Moreover, no such difference of behaviour was observed in the case of the alkali-metal and ammonium salts of the di-isopropyl-naphthalene-sulphonic acids.

Our discovery thus renders tri-isopropyl-naphthalene-beta-sulphonic acid available to the art in convenient physical form, with all its attendant advantages.

Without limiting our invention to any particular procedure, the following example, in which parts by weight are given, will serve to illustrate our preferred mode of operation.

Example 334 parts of tri-isopropyl-naphthalene-beta-sulphonic acid, which has previously been freed as much as possible from sulphuric acid, is thoroughly triturated with ammonia solution of 26 to 27% ammonia content, until the mass is slightly alkaline. The amount of ammonia solution necessary will be approximately 100 parts. Water is then slowly added, with constant trituration, until the weight of the product is 530 parts. About 96 parts of water will be required. Trituration is then continued until the mass is perfectly homogeneous.

The paste prepared as described above represents approximately 50% active material and contains approximately 60% total solids. Generally, however, these figures will depend upon the quality of the tri-isopropyl-naphthalene-sulphonic acid employed. The wetting-out power of the finished paste, when tested by the Draves-Clarkson method, is approximately 23 to 27 seconds at a concentration of 2.5 grams per liter.

Analysis of a sample of the product, after suitable purification, shows it to be the ammonium salt of tri-isopropyl-naphthalene-beta-sulphonic acid.

The procedure in the above example is capable of very wide variation. If desired, the ammonium salt may be prepared in dry form and triturated with the desired amount of water. By variation of the water content very thick plastic pastes, or nearly liquid pastes may be obtained; the more liquid pastes, however, are less stable than the thick pastes. A paste of 30 to 75% solids forms the best composition for commercial purposes. If resistance toward discoloration is desired, the precaution should be taken to make the paste slightly alkaline.

It will be understood that many other variations and modifications are possible in our preferred mode of procedure, without departing from the spirit of this invention.

We claim:

1. An aqueous paste essentially comprising the ammonium salt of tri-isopropyl-naphthalene-beta-sulphonic acid.

2. An aqueous paste essentially comprising from 30 to 75% by weight of the ammonium salt of tri-isopropyl-naphthalene-beta-sulphonic acid.

3. An aqueous paste for use as a wetting agent, consisting of substantially 40 parts of water and substantially 60 parts of the ammonium salt of tri-isopropyl-naphthalene-beta-sulphonic acid.

4. The process which comprises triturating tri-isopropyl-naphthalene-beta-sulphonic acid with aqueous ammonia to produce a paste.

HENRY J. WEILAND.
MILTON A. PRAHL.